United States Patent [19]

Heinrich et al.

[11] Patent Number: 5,652,302
[45] Date of Patent: Jul. 29, 1997

[54] PROCESS FOR PRODUCING THE VISCOSITY, LONG SHELF LIFE SILICONE RESIN SOLUTIONS

[75] Inventors: Lothar Heinrich; Helga Sadowski, both of Dresden; Günter Beuschel, Nünchritz, all of German Dem. Rep.

[73] Assignee: Hüls Silicone GmbH, Germany

[21] Appl. No.: 649,272

[22] Filed: Jan. 30, 1991

Related U.S. Application Data

[63] Continuation of Ser. No. 359,362, May 31, 1989, abandoned.

[30] Foreign Application Priority Data

Jun. 28, 1988 [DD] German Dem. Rep. ............ 31 63 517

[51] Int. Cl.$^6$ ........................................... C08K 5/05
[52] U.S. Cl. .............. 524/765; 528/15; 528/12; 528/18; 528/19; 528/26; 524/379
[58] Field of Search ...................... 528/15, 12, 18, 528/19, 26; 524/765, 379

[56] References Cited

U.S. PATENT DOCUMENTS

| | | | |
|---|---|---|---|
| 3,155,634 | 11/1964 | Pike | 528/12 |
| 3,668,228 | 6/1972 | Zbinden et al. | 528/19 |
| 3,919,344 | 11/1975 | Merrill et al. | 260/825 |
| 4,130,599 | 12/1978 | Merrill et al. | 260/825 |
| 4,141,926 | 2/1979 | Ariga et al. | 427/387 |
| 4,486,476 | 12/1984 | Fritsch et al. | 528/18 |
| 4,781,973 | 11/1988 | Zotto | 528/16 |

FOREIGN PATENT DOCUMENTS

| | | |
|---|---|---|
| 107129 | 5/1984 | European Pat. Off. . |
| 228550 | 10/1985 | German Dem. Rep. . |
| 2747233 | 7/1978 | Germany . |
| 3022308 | 12/1980 | Germany . |

OTHER PUBLICATIONS

East German TGL Standard 14301 Mar. 1962.
Noll: Chemie und Technologie Der Silicone Verlag Chemie, 1968 pp. 183, 357.
Deutsche Farben Zeitschrift 1956, No. 1, pp. 4–5.

*Primary Examiner*—Melvyn I. Marquis
*Attorney, Agent, or Firm*—Schweitzer Cornman & Gross

[57] ABSTRACT

The invention is an improvement in a process for producing silicone resins, to produce a silicone resin that has a high dynamic viscosity of at 293° K. of from about 40 to about 300 mPas, a long shelf life, and a siloxane content of from about 50 to about 70 ma %, by the condensation of oligomeric siloxanes in concentrated solutions, by carrying out the condensation by heating at reflux and in the presence of a metal containing catalyst and dicarboxylic acid.

9 Claims, 1 Drawing Sheet

5,652,302

PROCESS FOR PRODUCING THE VISCOSITY, LONG SHELF LIFE SILICONE RESIN SOLUTIONS

This is a continuing application of U.S. Ser. No. 359,362, filed on May 31, 1989, now abandoned.

FIELD OF THE INVENTION

The invention relates to the production of highly viscous silicone resin solutions having a long shelf life and a dynamic viscosity of from about 40 to about 30 mPAS at 293° K. and a siloxane content of from about 50 to about 70 ma %. These silicone resin solutions are suitably used as bonding agents for coatings employed at high temperatures. They are also used in electrical insulating resins, laminating resins, as well as in protective coatings in the building industry.

BACKGROUND OF THE INVENTION

Silicone resin solutions are suitably hydrolyzation products of the thermal or catalytic condensation of high concentrations of organic silanes. Acids, bases or metal compounds can be used as catalysts. The metal catalyzed condensation is generally preferred due to its relative simplicity. Thus, for example, the water formed during the condensation can be immediately azeotropically removed and the reaction can be easily stopped by dilution with solvents and cooling. The silicone resin solution can be stabilized at room temperature for example by the addition of chelating and complex-forming additives such as acetylacetone, acetoacetic ester, malonic acid as well as cerium salts, or cyclohexanone (see. e.g. W. Noll, Chemie und Technologie der Silicone, publ. by Verlag-Chemie G.m.b.H., Federal Republic of Germany, 1968, pp. 183–357) also published by Academic Press, in 1968.

Condensation to low viscosity silicone resin solutions, such as are contained in most commercial products, can be conducted without difficulty. Problems occur, however, when higher viscosity silicone resin solutions have to be produced, such as required for additives as bonding agents for coatings. Condensation takes place in this case in a range in which the viscosity increases at a very rapid rate so that the process can no longer be controlled. It is generally not possible to produce silicone resins with a predetermined higher viscosity with certainty, since viscosity strongly and uncontrollable increases within the time period required for the termination of the condensation reaction. Often even a gel formation cannot be avoided. Gel formation is a phenomenon that gives much concern in the production of silicone resins since it leads to a total loss of the starting material and the removal of the gel requires a great effort and is very difficult.

Specific condensation conditions are required for the production of silicone resins having a higher viscosity, and to avoid gel formation. U.S. Pat. Nos. 3,919,344 and 4,130,599 disclose condensation in dilute solutions. To avoid gel formation, the solids content of the solutions to be condensed cannot exceed 40%. Working with highly diluted solutions requires an undesirably high degree of technological effort and is costly and also results in various disadvantages from the point of view of safety.

According to German Federal Republic patent No. 3,022,308 gel formation is prevented by employing the hydrolyzed intermediate as a so-called nucleating catalyst. Only alkoxysilanes can be used as the organic silane and during their condensation there are no larger concentrations of SiOH groups. The resulting alcohol and the residual alkoxy groups further stabilize the silicone resin solution. The drawback of this process is that the alkoxysilanes have to be produced in a further process step.

Modification with organic resins is employed specifically for the production of silicone resin solutions for coatings to stabilize them and to increase the viscosity. U.S. Pat. No. 4,141,926 discloses the use of epoxides and Federal German patent No. 2,747,233 discloses the use of acrylic and methacrylic acid esters.

U.S. Pat. No. 3,919,344 discloses a process (particularly in column 7, last paragraph, and in column 8, Example 1) for the production of resins having a low SiOH group content, by reacting a dilute, 10–40 ma % solids content, silicone resin solution for an extended period of time with an acid, followed by condensation with a dilute, 30–40 ma %, solution of an alkali metal hydroxide, and then neutralization with acetic acid. After filtering off the salts the resin can be concentrated to a solids content of 70–80 ma %.

DESCRIPTION OF THE INVENTION

The object of the invention is to provide an industrial scale process for the production of silicone resin solutions having a high viscosity and long shelf life, by condensation of concentrated solutions of oligomeric siloxanes. Condensation should be available simply with siloxanes that can be obtained in a simple manner through industrial scale manufacture and the predetermined viscosity of the end products should be obtained in a reliable fashion. Gel formation should not occur and the end product should have a room temperature shelf life of at least six months. The condensation reaction of concentrated solutions of oligomeric siloxanes with a metal containing catalyst should produce high viscosity, high shelf life silicone resin solutions, wherein the sharp increase of the viscosity-time curve should be avoided and the silicone resin end product should have a siloxane content of from about 50 to about 70 ma % and a dynamic viscosity at 293° K. of from about 40 to about 300 mPAS.

The foregoing objectives are satisfied by condensing concentrated solutions of oligomeric siloxanes by heating under reflux in the presence of a metal containing catalyst and a dicarboxylic acid until a predetermined viscosity is achieved. Condensation is thereafter terminated by cooling and dilution in a manner known per se.

It was surprising to find that the simple method widely known for the preparation of low viscosity silicone resins, can be adapted by the use of metal containing catalyst for preparing high viscosity silicone polymers with a long shelf life, when the condensation is carried out in the presence of a dicarboxylic acid. The complicated and time consuming pre-and post-treating procedures of the prior art, such as prolonged reaction with acid, neutralization, and filtration, are not required and the end product can be obtained reliably, predictably and with good reproducibility.

BRIEF DESCRIPTION OF THE DRAWINGS

Reference is made to the attached drawing wherein.

Figure 1:
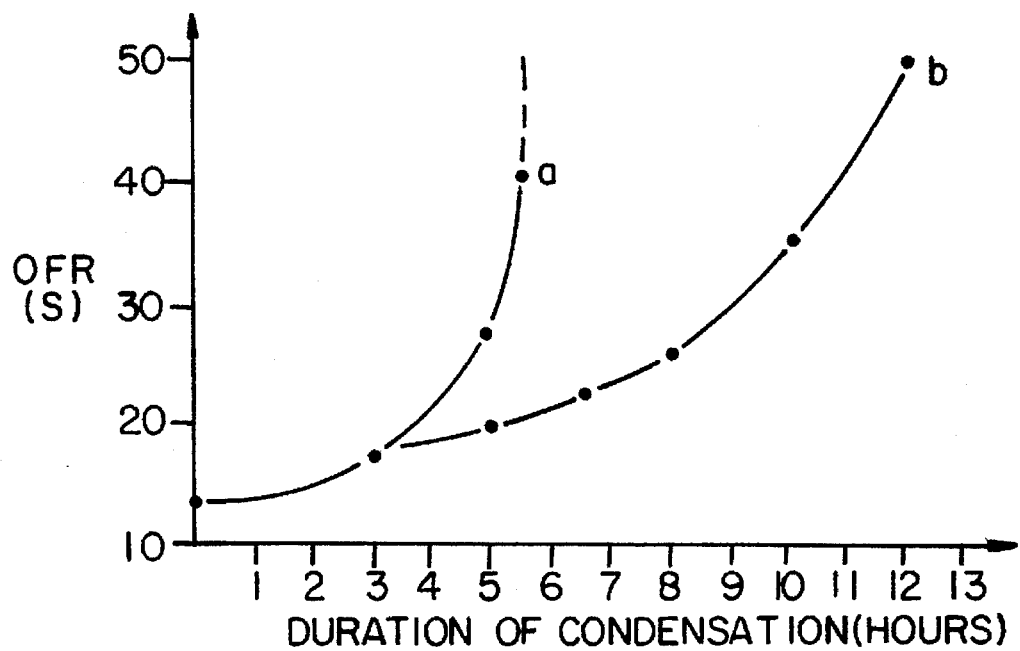
FIGS. 1 and 2 show the changes of viscosity in the case of specific examples and controls set out hereinbelow.

As the dicarboxylic acid suitably from about 100 to about 800 ppm of one or more of malonic-, succinic-, and adipic-acid is employed, based on the amount of siloxane. The acid is suitably added to the starting mixture in the form of a 5% solution. Any organic solvent can be used that is a good solvent for both the dicarboxylic acids as well as the siloxane solution and has a boiling point which is the same or higher than the boiling point range of the siloxane solution. Suitably, for example ethanol, or 2-ethoxyethanol can be employed as the solvent.

The metal containing catalyst can be a metal salt of organic or inorganic acids, for example zinc- and/or lead isooctoate, or $FeCl_3$. The metal content should be suitably between 5 and 250 ppm based on the amount of siloxane.

Suitably hydrolyzate solutions of organic silanes, preferably of organic chlorosilanes are used as the oligomeric siloxane solutions. These are concentrated suitably to a siloxane content of from about 80 to about 90 ma % by evaporation of the solvent. Preferably aromatic solvents are employed, which form azeotropically boiling mixtures with the condensation water that was formed. The water can then be removed without any problem from the vapors by their condensation.

It was surprisingly found that highly viscous silicone resin solutions can be safely and reliably produced also under simple conditions which exist for example in the metal-catalyzed condensation of hydrolization products of organic silanes. It is possible to affect in a decisive manner the progress of the increase in viscosity during condensation by the addition of small amount of a dicarboxylic acid. Thus, the rapid rise of the viscosity/time curve is avoided so that the condensation can be terminated precisely at predetermined viscosities by dilution and cooling without any problem.

It was found to be preferable for economical timing in the case of condensations which initially take place rather slowly, to add the dicarboxylic acid solution only after a predetermined viscosity value was achieved. For example, in the case of methylphenyl silicone resins this can take place after a viscosity of from about 50 to about 65 mPas was reached. The addition of dicarboxylic acid solutions also stabilized the silicone resin solutions which are stored at room temperature, and thus, at least an additional six months shelf life can be achieved.

The invention is further disclosed through a number of illustrative examples thereof. In all of the following examples viscosity is determined after dilution of the sample to the required siloxane concentration of the end product, by means of the outflow rate (OFR) required in a Ford dynamic viscometer (according to TGL Standard No. 14,301) at 293° K. by employing a No. 4 orifice. Furthermore, in the examples, the dicarboxylic acid can be added at a concentration of less than 10%, but in the examples 5% ethoxyethanolic solution, the condensation water obtained by reflux is separated, as also in all cases the condensation is terminated by draining the contents of the reactor into 600 liters of cold toluene or xylene, and is then adjusted to the required siloxane concentration.

All resins obtained with the following examples had a shelf life of at least six months. Throughout the specification and the claims including in the following examples, the abbreviation "ma" refers to mass, and all percentages are by mass. "mPas" means milli-pascal seconds (the same as centipoise).

EXAMPLE 1

A siloxane solution in toluene, obtained from the hydrolysis of a chlorosilane composition comprised of 293 liters dimethyldichlorosilane (DDS), 149 liters diphenyldichlorosilane (DPDS), 165 liters methyltrichlorosilane (MTS), and 393 liters phenyltrichlorosilane (PTS) having a siloxane content of 20 ma %, is concentrated to 80 ma % siloxane content by distillation. 1 ton of this solution is reacted with 2 kg of zinc isooctoate (containing 10% Zn) and 33 g lead isooctoate (lead content 24%), and heated to reflux. After the viscosity responded to an OFR of from about 17 to about 20 seconds, 3,440 g succinic acid solution is added without interrupting reflux heating. When a viscosity corresponding to OFR of about 50 seconds is obtained, the condensation is terminated and a silicone resin solution having a dynamic viscosity of 250 mPas at 293° K. with a siloxane content of 55 ma %.

CONTROL 1

The process of Example 1 was repeated without the addition of the succinic acid solution. After a viscosity corresponding to OFR of 40 seconds the contents of the condensation vessel gelled within 15 minutes before its contents could be drained.

The increase in viscosity during condensation of the process of Example 1 and Control 1 are shown in FIG. 1. The curve "a" corresponds to Control 1, and the curve "b" to Example 1.

From these curves it becomes clear that the increase of viscosity is considerable retarded in the case of Example 1 in comparison to that of Control 1.

EXAMPLE 2

A siloxane solution in toluene, containing 20 ma % siloxane, obtained from the hydrolysis of the reaction product of MTS and methanol is concentrated by distilling the toluene to a siloxane content of 80 ma %. 1,200 g of a 2% $FeCl_3$ solution is added to 1 ton of this solution. The $FeCl_3$ was prepared immediately before use from a 40% $FeCl_3$ solution. The solution is heated at reflux. After distilling off the water 3,443 g succinic acid solution are added. At a viscosity corresponding to OFR of 19 seconds the condensation is interrupted. The resulting methylsilcone resin solution has a siloxane content of 55 ma % and at 293° K. a dynamic viscosity of 58 mPas.

CONTROL 2

The process of Example 2 was carried out similarly to Control 1, by omitting the addition of the succinic acid solution. After a viscosity corresponding to OFR of 15 seconds the contents of the reactor vessel were drained. The draining matter gelled during the draining.

Figure 2:
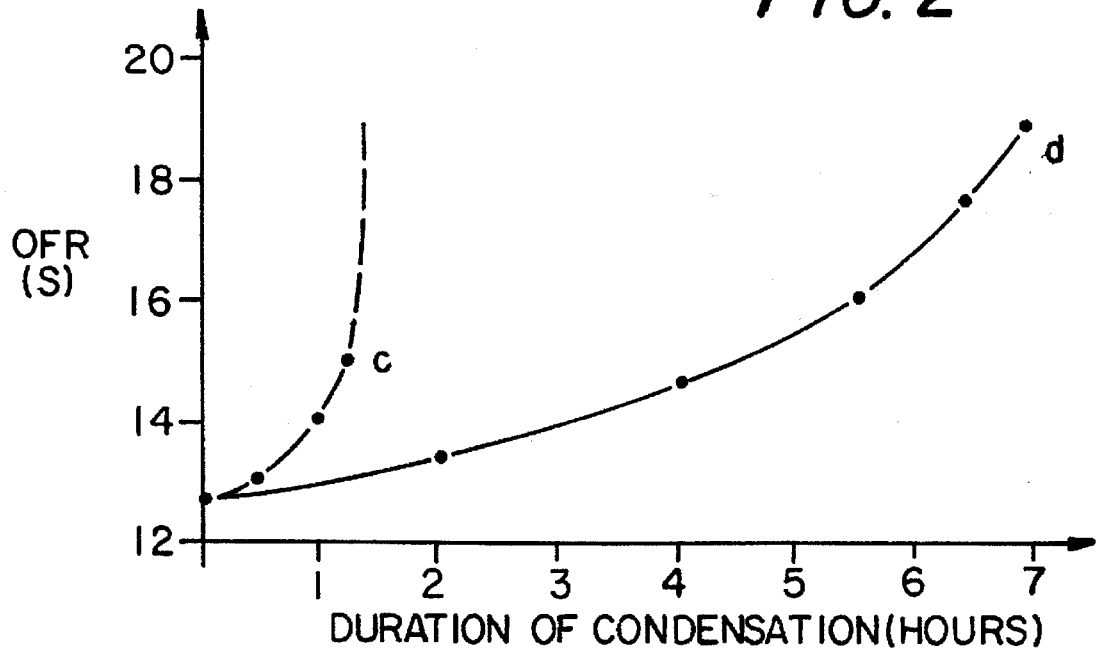

The viscosity increase during concentration according to Example 2 and Control 2 are shown in FIG. 2, where the curve "c" corresponds to Control 2, and the curve "d" corresponds to Example 2.

EXAMPLES 3–5

The siloxane solution in toluene containing 27 ma % siloxane obtained from the hydrolysis of a chlorosilane mixture containing 1,217 liters MTS, 1,656 liters PTS, 1,030 liters DDS, and 1,097 liters DPDS, is concentrated by distilling off toluene, to a siloxane content of 90 ma %, and then adjusted by dilution with xylene to 85 ma %. One ton of this solution is reacted with 1.7 kg zinc isooctoate (containing 10% Zn) and condensed at reflux. After obtaining a viscosity corresponding to OFR of 17–20 seconds, the dicarboxylic acid solution is added and the condensation is terminated at the viscosity corresponding to OFR of 50 seconds. The various parameters for the Examples 3–5 are given in the following table. The solutions contain 60 ma % siloxane.

| Example | Dicarbonic Acid | Amount of Acid | Viscosity* |
| --- | --- | --- | --- |
| 3 | malonic acid | 3,000 g | 300 |
| 4 | adipic acid | 4,300 g | 250 |
| 5 | succinic acid | 7,000 g | 100 |

*Dynamic viscosity in mPas at 293° K. in a 60% solution

EXAMPLE 6

This Example is carried out in the same manner as in Examples 3–5 with the exception that a composition of the chlorosilane mixture is 1,325 liters MTS, 2,105 liters PTS, and 1,570 liters DDS; and the addition of 4,300 g succinic acid takes place at a viscosity corresponding to OFR of 16–19 seconds. The dynamic viscosity of the resulting 65% silicone resin solution is 100 mPas at 293° K.

EXAMPLE 7

A siloxane solution in toluene, containing 18 ma % siloxane obtained from the hydrolysis of the reaction product of MTS and methanol is concentrated to 90 ma % by distilling off toluene, and is then rediluted to 80 ma % by the addition of xylene. 530 g of a 2.2% aqueous solution of $FeCl_3$ is added to one ton of this previously obtained solution. The $FeCl_3$ solution was prepared immediately before its use from a 40% $FeCl_3$ solution. The reaction solution is heated at reflux and the water is distilled off and 7,000 g succinic acid solution is added. The condensation is terminated after reaching a viscosity corresponding to OFR of 23 seconds. A methylsilicone resin solution is obtained having a dynamic viscosity at 293° K. of 70 mPas and containing 60 ma % siloxane.

We claim:

1. In a process for producing a silicone resin solution by the condensation of oligomeric siloxanes in concentrated solutions in the presence of a metal containing catalyst, the improvement which comprises conducting the condensation by heating at reflux in the presence of malonic, adipic or succinic acid, or a mixture thereof to obtain a product having a high dynamic viscosity of from about 40 to about 300 mPas at 293° K., a shelf life of at least six months, and a siloxane content of from about 50 to about 70 ma %.

2. The improvement in the process of claim 1, wherein said acid is employed at a concentration of about from 100 to about 800 ppm based on the amount of the siloxane mass.

3. The improvement in the process of claim 1, wherein a solution in an organic solvent of the said acid is used.

4. The process of claim 2, wherein a solution in an organic solvent of the said acid is used.

5. The process of claim 3, wherein said solution contains less than 10% of said acid.

6. The process of claim 4, wherein said solution contains less than 10% of said acid.

7. The process of claim 5, wherein the organic solvent is ethanol, or an ethoxyethanol.

8. The process of claim 1, wherein the metal-containing catalyst is a metal salt of an organic or inorganic acid having a metal content of from about 5 to about 250 ppm based on the siloxane mass.

9. A silicone resin solution produced by the process of claim 1.

* * * * *